United States Patent Office 2,732,356
Patented Jan. 24, 1956

2,732,356
OIL COMPOSITION FOR AIR FILTERS

Charles E. Paxton, Jamesburg, N. J., assignor to Esso Research and Engineering Company, a corporation of Delaware No Drawing. Application February 11, 1952, Serial No. 271,079

7 Claims. (Cl. 260—23)

The present invention relates to an improved oil composition for air filters and particularly to a mineral oil containing an improved combination of tackiness or adhesive agents by which it adheres properly to the strands or fibres, etc., of an air filter or equivalent device and also picks up and holds dust and other foreign matter coming in contact therewith.

In the prior art it has been the practice for some time to dip air filters, such as are used in air straining or conditioning apparatus and the like, containing stranded, matted, or fibrous material, into oil or oily material to improve their dust adsorptive or dust holding capacity. Such filters, as is well known, are usually and primarily composed of a mat of fibres arranged criss-cross and miscellaneously so that air passing through the filter must move in a devious path. By the use of an adherent film of oil, or the like, the dust particles entrained in the air are extracted and held by the filter fibres. Such filters are widely used in space heating systems, air conditioning systems, in the intakes of refrigeration apparatus and various types of internal combustion engines, as well as in many other locations and installations. The conditions of temperature, air velocity, etc., vary widely for different installations. One particular installation where difficulty has been encountered in obtaining an oil of optimum tackiness, or adhesive qualities, is in the intake air filters of diesel locomotives. Diesel locomotives are driven by internal combustion engines of relatively large horsepower and large air requirements. It has been the practice in the past to provide such locomotives with a fibrous type filter which is dipped in a mineral base oil, usually an oil of lubricating grade and viscosity. Such oils tend largely to drip off the filter, especially at the relatively elevated operating temperatures of diesel locomotive engines. This tendency may be less pronounced in other filters where air is filtered at less elevated temperatures, but it exists to a greater or lesser degree in all types of oil treated fibrous filter media.

A major purpose of the present invention is the modification of the filter oil to improve its adherence to the fibrous structure and also to enhance its capacity to take up dust from the air which passes through it. This is accomplished by the use of what now appears to be an optimum combination of a conventional tackiness agent, such as stringy liquid polymer, e. g. a hydrocarbon of the elastomer type, in combination with a small amount of an alkali metal soap.

Specifically, a preferred form of the invention involves a mineral oil of appropriate grade and viscosity containing about 1 to 5% of a hydrocarbon polymer, e. g. a polymer of isobutylene or a copolymer of isobutylene and styrene. To this is added from 0.1 to 2% by weight, or preferably about 0.25 to about 0.5%, of an alkali metal soap, such as a stearate, preferably lithium stearate, although sodium stearate or the soaps of closely related fatty acids may also be used in some cases.

A series of tests were made to determine the optimum tackiness agents for the peculiar purposes of the present invention. It was found that lithium stearate is considerably superior to the other soaps tested when used in combination with a tacky polymer, e. g. about 2% of an oil solution of isobutylene polymer of medium molecular weight, i. e. of about 50,000 to 100,000. Sodium stearate was considerably less effective with this polymer. Aluminum stearate was much less effective than the sodium stearate. The difference is so great that lithium stearate or the lithium soaps of other fatty acids near the $C_{18}$ range appear to be superior to an unexpected degree over the other soaps. As indicated above, sodium stearate has some effect. The other metal stearates are relatively quite useless. The invention will be more clearly understood by reference to the following examples.

*Example I*

A mineral base lubricating oil of about 70 S. S. U. viscosity at 210° F. was combined with 2% by weight of a viscous polymeric oil additive. This additive consists of a mineral oil of lubricating grade containing 8 to 10% by weight of an isobutylene polymer of about 60,000 to 100,000 molecular weight. This additive is commonly used as a tackiness agent in lubricating oils, gear oils and the like. This composition, containing about 0.16 to 0.2% of the polymer per se was tested for its adhesion to an air filter at temperatures respectively of 125° F., and 200° F. It was also tested for adhesion at the same temperatures by coating it on a 2 x 4 inch smooth metal panel, measuring the milligrams of oil which adhered to the metal after it had been conditioned to a constant weight, i. e. so that no further oil drained away.

In the above tests the mineral oil plus 2% of the tacky polymer solution showed an adherence of 10.5 milligrams of oil per square inch on the metal panel at 125° F. At 200° F. this was reduced to 6.8 millimeters per square inch. On the air filter, adherence was 36.5 grams in standard filters of 7" x 7" x 2" size, and 16.9 grams at 200° F.

*Example II (a) (b)*

The composition of Example I was combined with various proportions of different soaps to determine their effect on adhesion to the metal and to the air filter respectively. (a) With 0.5% aluminum stearate, adherence at 200° F. to the metal panel was 8.5 milligrams per square inch, slightly more than the composition of Example I which contained no soap. (b) This increased to 11.1 milligrams with 1% sodium stearate, a very slight improvement over Example I. Both of these values were considered quite low, although the sodium stearate showed some utility.

*Example III*

The composition of Example I was modified by adding 0.5% by weight of the lithium stearate. This showed a remarkable increase in adhesivity both to the metal and to the air filters. At 125° F. 49.3 milligrams of oil adhered to each square inch of the metal panel, this being reduced to 26.2 milligrams at 200° F. On the air filters, 126.3 grams adhered at 125° F., about 3½ times as much adhered when the lithium soap was not used. At 200° F., 110.6 grams still adhered to the filters, only a moderate reduction from the amount which adhered at 125° F., and more than seven times as much as was retained in Example I. Since the quantity of soap used was very small, it is evident that lithium stearate has an outstanding effect in improving the adhesion of the oil.

Example IV

In order to determine the effect of soap per se, the same base mineral oil used in Example I was combined with 0.5% by weight of lithium stearate. It adhered quite well to the metal panel at 200° F., but was so devoid of tackiness that it had no particular utility as a filter coating medium.

Example V (a) (b)

(a) The same oil as in Example I and IV was combined with 0.25% by weight of lithium stearate. At 200° F. 6.9 milligrams adhered to each square inch of the metal panel. (b) When 1% of the tacky polymer solution described above was added, the quantity adhering to metal at 200° F. increased to 9.9 milligrams. What is more significant, however, is the fact that the adherent fibre was very much more tacky and, hence, much more effective as a dust holding medium.

Example VI

Example III was repeated, substituting 0.5% of lithium oleate for a similar proportion of lithium stearate. The product did not adhere quite so well as Example III but was quite effective, 71.5 grams of oil being held as compared with 110.6 of Example III at 200° F.

Example VII

Example I was repeated, using, however, 4% of the polyisobutylene solution instead of 2%. In the metal panel test only 9.9 milligrams adhered per square inch at 125° F. The proportion of polymer used seems to make no significant difference in adhesion to the metal.

Apparently the polymer is required to give the oil the necessary tacky quality to pick up and hold the dust particles. The soap, on the other hand, seems to be essential to cause the composition to adhere and not drain away from the supporting fibres of the filter.

The above data are tabulated as follows:

FILTER OIL CHARACTERISTICS

| Composition | Metal Panel Test, mg./sq. in. | | Filter Adhesion, g./filter, 7″ x 7″ x 2″ | | Tackiness |
|---|---|---|---|---|---|
| | 125° F. | 200° F. | 125° F. | 200° F. | |
| Oil, 70 S. S. U. vis. @ 210° F. (No additive). | 9.4 | | | | Light tackiness. |
| Ex. I—2% Poly. Sol | 10.5 | 6.8 | 36.5 | 16.9 | Tacky. |
| Ex. II (a)—0.5% Al. Stear | | 8.5 | | | Non-Tacky. |
| Ex. II (b)—0.5% Na. Stear | | 11.1 | | | Do. |
| Ex. III—2% Poly. Sol.+0.5% Li Stearate | 49.3 | 26.2 | 126.3 | 110.6 | Tacky. |
| Ex. IV—0.5% Li. Stear | | 28.4 | | | Non-Tacky. |
| Ex. V (a)—0.25% Li. Stear | | 6.9 | | | Do. |
| Ex. V (b)—0.25% Li. Stear.+1% Poly Sol | | 9.9 | | | Tacky. |
| Ex. VI—2% Poly. Sol.+0.5% Li. Oleate | | | | 71.5 | Do. |
| Ex. VII—4% Poly. Sol | 9.9 | | | | Do. |

The blanks in the table indicate that tests were not made, being considered unnecessary in view of the data obtained.

From the foregoing, it appears that it is desirable to use the soap, preferably of lithium, to hold the oil on the filter and to use the polymer solution additive to hold dust to the oil film. Neither ingredient by itself adds particularly to the performance over that of straight mineral oil. A composition having 0.25 to 0.5% lithium soap and 1 to 2% of the 8 to 10% polymer solution (0.08 to 0.2% of polymer per se) appears to be about optimum. From inspection, it is apparent that other tacky polymers such as "stybutene" (styrene-polyisobutylene) and "Butyl" or natural rubber polymers or copolymers, broken down to a proper molecular weight for high tackiness, may be substituted for polyisobutylene, so long as they are of appropriate, i. e. medium molecular weight (e. g. 25,000 to 125,000, preferably 60,000 to 100,000) so as to confer a good degree of tackiness on the oil. The proportions of additives may be varied somewhat more widely if desired, e. g. 0.1 to 2% of soap and 0.05 to 1% of polymer (0.4 to 10% of the conventional polymer solution in oil), for some purposes.

The capacity of the filter to take up dust from air passing therethrough is approximately in direct proportion to the amount of oil which adheres to the filter. It is evident that the use of a small amount of the tacky polymer and a very small amount of the lithium stearate effects a remarkable improvement.

It will be understood, of course, that oils of various viscosities may be used and that the proportion of the respective additives may be varied depending somewhat upon the fineness of the fibres of which the filter is composed and depending even more on the temperature range at which the filter is to be used. It will be understood, of course, that the oils employed may have other constituents, although, in general, those described above appear to be about optimum.

What is claimed is:

1. A tacky oil composition for coating air filters and the like consisting essentially of a mineral oil of lubricating grade and viscosity containing about 0.05 to 1% of a tacky elastomer polymer of 25,000 to 125,000 molecular weight and about 0.1 to 0.5% of a lithium fatty acid soap.

2. An oil composition for coating the fibrous air filter and the like consisting essentially of mineral base oil of lubricating grade and viscosity containing about 0.05 to 1% of a tacky hydrocarbon polymer of molecular weight within the range of about 25,000 to 125,000, and about 0.1% to 0.5% of a lithium soap of fatty acids of approximately $C_{18}$ average chain length.

3. Composition according to claim 2 wherein the soap is lithium stearate.

4. Composition according to claim 2 wherein the soap is lithium oleate.

5. An oil composition for coating fibrous air filters and the like consisting essentially of a mineral base oil of lubricating grade and viscosity having a viscosity between about 35 and 100 S. S. U. at 210° F. and containing about 0.08 to 0.2% by weight of a viscous hydrocarbon polymer having a molecular weight within the range of 25,000 to 125,000, and about 0.5% by weight of lithium stearate.

6. Composition according to claim 5 wherein the polymer is polyisobutylene of molecular weight within the range of about 60,000 to 100,000.

7. A tacky oil composition having the property of adhering to fibrous filter media and the like and having a tacky surface characteristic such as to retain dust particles coming in contact therewith, comprising a mineral oil of lubricating grade and viscosity, a lithium soap in proportions of 0.25 to 0.5% by weight, based on the total composition, and 0.08 to 0.2% of a viscous tacky polyisobutylene of 25,000 to 125,000 molecular weight.

References Cited in the file of this patent

UNITED STATES PATENTS

| | | |
|---|---|---|
| 1,979,943 | Klemgard | Nov. 6, 1934 |
| 2,122,593 | Stafford | July 5, 1938 |
| 2,124,235 | Mueller Cunradi | July 19, 1938 |
| 2,145,898 | Simpson | Feb. 7, 1939 |
| 2,393,797 | Morgan | Jan. 29, 1946 |
| 2,453,833 | Davis et al. | Nov. 16, 1948 |
| 2,491,054 | Morway | Dec. 13, 1949 |
| 2,648,634 | Moore | Aug. 11, 1953 |